United States Patent [19]

Ljung

[11] 4,202,089
[45] May 13, 1980

[54] SPLAT-COOLED INSTRUMENT FLEXURE AND METHOD TO FABRICATE SAME

[75] Inventor: Bo Hans G. Ljung, Wayne, N.J.

[73] Assignee: The Singer Company, Little Falls, N.J.

[21] Appl. No.: 912,231

[22] Filed: Jun. 2, 1978

[51] Int. Cl.² .......................................... B22D 11/126
[52] U.S. Cl. ..................................... 29/527.6; 164/87; 74/5 F
[58] Field of Search ......................... 29/527.6; 164/87; 74/5 F

[56] References Cited

U.S. PATENT DOCUMENTS

| | | | |
|---|---|---|---|
| 2,091,903 | 8/1937 | Baggett et al. | 164/87 X |
| 2,804,667 | 9/1957 | Townhill | 164/87 |
| 2,995,938 | 8/1961 | Brodersen et al. | 74/5 F |
| 3,066,401 | 12/1962 | Morel et al. | 29/527.6 X |
| 3,354,726 | 11/1967 | Krupick et al. | 74/5 F |
| 3,365,791 | 1/1968 | Olsson | 29/527.6 |
| 3,618,403 | 11/1971 | Bilinski | 74/5 |
| 3,700,290 | 10/1972 | Ensinger | 308/2 A |
| 3,710,842 | 1/1973 | Mobley et al. | 164/87 |
| 3,856,513 | 12/1974 | Chen et al. | 164/87 |
| 3,881,541 | 5/1975 | Bedell | 164/87 |

Primary Examiner—Francis S. Husar
Assistant Examiner—V. K. Rising
Attorney, Agent, or Firm—L. A. Wright; T. W. Kennedy

[57] ABSTRACT

A machine for manufacturing high strength flexure hinges having use in accelerometers. A source of metal material is splat-cooled after it has been heated to a molten state. An induction heater heats the metal material to the molten state and the molten metal is rapidly cooled while being pressed between two water cooled wheels. The wheels are provided with indentations and protuberances on their surfaces to produce flexure hinges and strengthening beams. A chute is provided to catch the flexures as they leave the wheels preventing damage to them.

2 Claims, 6 Drawing Figures

SPLAT-COOLED INSTRUMENT FLEXURE AND METHOD TO FABRICATE SAME

PRIOR ART U.S. Pat. No. 3,354,726, Krupick, 11/67;

U.S. Pat. No. 3,700,290, Ensinger, 10/72; "Metal Glasses" American Society for Metals, Metals Park, Ohio 44073, 1978.

This invention is related to a machine for manufacturing an instrument flexure employing a splat-cooled process.

BACKGROUND OF THE INVENTION

The accuracy of accelerometers for inertial navigation purposes have long been limited by the accuracy of the proof-mass suspension. Earlier designs have sought to eliminate some of these limitations by the use of flotation fluid to partly or totally eliminate mechanical forces acting upon the proof-mass suspension. Although successful in the stated purpose, such accelerometers are very difficult to produce and hence prohibitively expensive. Most accelerometers produced today are of the air-filled type. In these kinds of accelerometers, the flexure suspension must maintain a high spring rate against movements that do not coincide with their input or sensitive axis. In order to give these kind of accelerometers the desired degree of accuracy, their pendulous mass must be made relatively high. In addition, it is necessary to permit relatively large deflections of the proof-mass in order to either guarantee a high shock capability or "memory" in nuclear hardened systems where a temporary loss in electrical functions result during a high flux exposure. The requirements thus stated results in a flexure suspension, where the stress levels are quite high.

Cold working from the machining operations together with the high operating stress combine to make the accelerometer flexure show considerable hysteresis and bias instability effects. Often hysteresis effects of several parts per thousand can be encountered, even in the most careful of designs. In order to still be able to manufacture accelerometers, other parameters must be compromised such as stop freedom about the input axis or the flexure must be made excessively weak in the direction of the input axis.

Splat cooling is a process in which a material is rapidly cooled so that it solidifies in an unorderly atomic form.

The advent of splat cooling makes it possible to create many heretofore unknown materials with unique properties. It has been known for some years that it is practical to manufacture such materials where the cooling is made rapidly in the order of $10^{6°}$ C. second, that metals solidify without an orderly atomic structure. These materials like glass are amorphous. One material commercially available from Allied Chemical is called Metglas. From an instrument standpoint this material is interesting because it lacks grain boundaries where energy absorption and thus hystereis and bias instability in conventional metals occur. The strength of metallic glass is also astonishing. It is about four times as strong as the most common accelerometer flexure material.

Up to this point, it has not been feasible to utilize these outstanding properties in an accelerometer flexure because cooling requirements are difficult to meet in order to produce metallic glass. Second, it is difficult to utilize metallic glass in strip form in accelerometer flexures because of problems in anchoring the metallic glass to the rest of the accelerometer structure as would be required in a "taut band" suspension, for instance.

BRIEF SUMMARY OF THE INVENTION

The present invention provides a machine for manufacturing high strength instrument flexures. It comprises a source of metal material which may be formed into an ingot. Means for heating the ingot may be by induction heating or other means. When the metal reaches a molten state a drop of or a stream of the molten material is allowed to fall between a pair of rollers which are water cooled. The rollers have protuberances on their surfaces so as to form a metallic hinge. Because the molten metal is rapidly cooled by the splat cooled process, the flexures are formed into a metallic glass. A chute which may be formed as a Archimedes spiral catches the flexures as they leave the rollers in order to prevent breakage of distortion. Alternately the molten material may be allowed to fall on a single wheel and the flexures are made upon the metallic glass sheet produced by this method by machining. In the first embodiment of the splat cooled process, a beam is formed in adjacent the flexure to strengthen the flexure during manufacture. This beam is subsequently removed by acid etching or machining during the final stages of manufacture.

Accordingly, it is an object of this invention to provide an instrument flexure of metal glass by the process of splat cooling having high tensile strength.

This and other objects, features and advantages of the present invention will become more apparent from the following description taken in connection with the accompanying drawings wherein.

Figure 1:
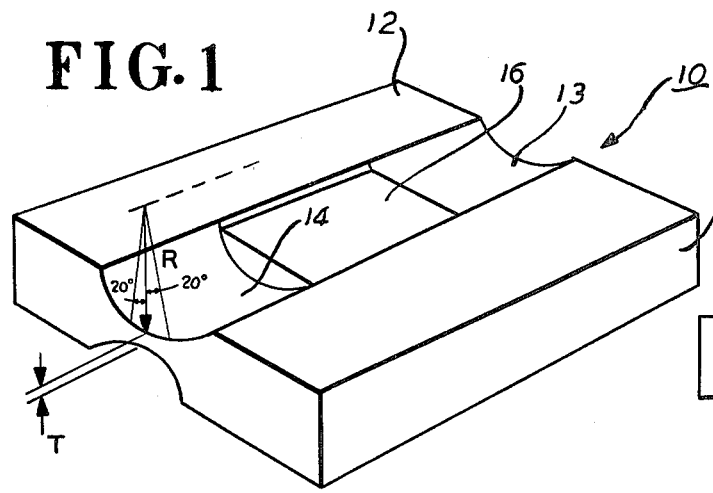
FIG. 1 shows a perspective view of a flexure hinge manufactured by the process of splat cooling.
Figure 2:
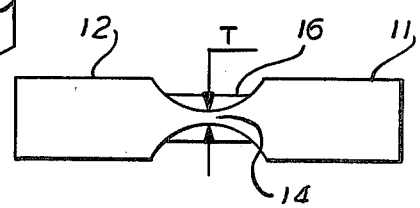
FIG. 2 is a side elevational view of the flexure hinge of FIG. 1.

The following is a detailed description of the splat cooled hinges and the method of fabricating them. Referring to FIGS. 1 and 2, there is shown a preferred embodiment of the flexure hinge 10 of the invention. The flexure hinge consists of two flat sections 11 and 12 having a thickness typically of several thousandths of an inch, joined by two necked down portions or flexures 13 and 14. Flexures 13 and 14 with the machine to be described hereinafter may be transformed into metallic glass. As shown at flexure 14, in flexing the hinge, only about ±20° around the symmetry axis, contribute significantly to the flexing. Due to the fact that the dimension T can be made small when a high strength material is utilized, this small thickness section will be transformed to metallic glass. The two flat sections 11 and 12 are joined by flexures 13 and 14 serve to attach on one side the proof mass (not shown) and on the other side the casing of the accelerometer. The depressed flat region 16 that can be seen in FIGS. 1 and 2 serves to hold the flexure support together during manufacturing. It consists of a section thin enough to transform at least partly to metal glass and thereby prevent residual quenching distortion of the hinges. It is etched or machined away in a later operation.

Figure 3:
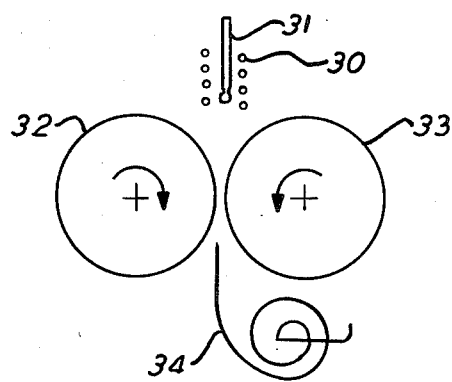
FIG. 3 shows a side elevational view of the machine employed to fabricate the flexure hinge of the invention.

The machine employed to fabricate the flexures is shown in FIG. 3. It consists of a high frequency induction heating coil 30 provided to melt metal ingot 31. Although a high frequency induction heating coil is depicted in FIG. 3, alternate means may be employed to heat the metal ingot. When the ingot is heated to a molten stage a drop of the molten material is caught between the rapidly rotating wheels 32 and 33 and the flexure is formed by indentations 40 (FIG. 4) formed in the periphery of wheels 32 and 33. Since the wheels are water cooled the flexure which is formed by the rapid cooling is a metallic glass composition having high tensile strength. The strength of the flexure formed by this process is about four times as strong as flexures formed by conventional means. The ready-made splat-cooled flexure hinges are then recovered in a chute 34. The entire apparatus may be encased in a gas tight enclosure which may be filled with an inert gas or merely evacuated. The recovery chute 34 resembles an "Archimedes" spiral in that it is designed to decelerate the fall of the flexure hinges evenly to a soft stop without causing damage to them.

Alternately a molten stream may be allowed to fall upon only one rapidly rotating wheel. In this manner a metallic glass sheet is produced and the flexures can be made upon the metallic glass sheet by machining.

Figure 4:
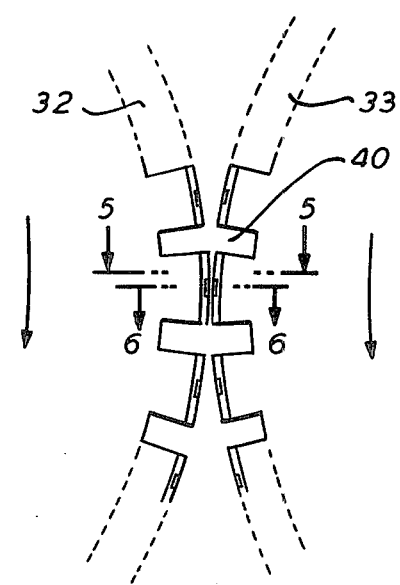
FIG. 4 is an enlarged view of the rollers of the machine shown in FIG. 3 showing the details of the rollers surfaces.
Figure 5:
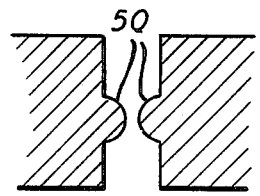
FIG. 5 is a view taken along line 5—5 of FIG. 4 showing the protuberances of the machine rollers for creating the flexure hinge.
Figure 6:
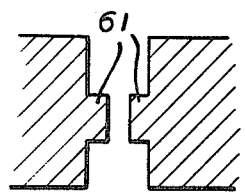
FIG. 6 is a view taken along the line 6—6 of FIG. 4 showing the protuberances on the rollers surfaces to create the flexure strengthening beam.

Turning to FIGS. 4, 5 and 6, the details of the indentation on the splat-cooled wheels 32 and 33 are shown. The deep indentations 40 are made to interrupt the casting of the hinges. The sectional views of the wheels taken along lines 5—5 and 6—6 of FIG. 4 and shown enlarged in FIGS. 5 and 6 respectively show the protuberance on the wheels which form the flexures 13 and 14 and the depressed flat section 16 of FIG. 1. In a preferred embodiment the wheels may be water cooled for continuous operation.

Compared to conventional flexures made by machining titaniun for example, the metal glass hinge possesses less hysteresis due to absence of grain boundaries, cold work during machining, etc. Further, due to the splat-cooled materials high strength and low hysteresis, the shape of the flexure hinge can be modified to advantage. Both the radius R and the web thickness T (FIG. 1) can be made smaller than conventional. A higher input axis spring rate can be tolerated due to its higher stability. These modifications lead to higher and thus improved spring rate in axes other than the input axis. Improved gas damping and decreased vibration rectification effects will result. Conventional flexures are fragile and delicate and, therefore, quite costly. The splat-cooled flexure hinges lend themselves to mass production at a very low cost.

While particular embodiments of the invention have been shown and described, modifications may be made, and it is intended in the following claims to cover the embodiments which fall within the true spirit and scope of the invention.

I claim:
1. The method of making a high strength flexure comprising the steps of:
heating a source of metal to form a molten material,
placing a quantity of said molten material on a rapidly moving water cooled wheel so as to form a sheet of metallic glass resulting from the rapid cooling of said molten material in contact with said water cooled wheel, and
machining said sheet of metallic glass into flexures having two flat portions connected at each end by a necked down portion of metallic glass material.
2. The method of claim 1 comprising the step of:
machining said sheet of metallic glass into flexures having two flat portions joined at each end by a pair of necked down portions of metallic glass material.

* * * * *